United States Patent

Shih et al.

[11] Patent Number: 5,122,696
[45] Date of Patent: Jun. 16, 1992

[54] MAIN LEAD CONNECTOR FOR A GENERATOR/MOTOR ROTOR

[75] Inventors: True T. Shih; James B. Archibald, both of Schenectady, N.Y.

[73] Assignee: General Electric Company, Schenectady, N.Y.

[21] Appl. No.: 668,902

[22] Filed: Mar. 13, 1991

[51] Int. Cl.$^5$ .......................................... H02K 13/00
[52] U.S. Cl. ...................................... 310/71; 310/270
[58] Field of Search .......................... 310/71, 270, 271

[56] References Cited

U.S. PATENT DOCUMENTS

| | | | |
|---|---|---|---|
| 2,269,493 | 1/1942 | Thomas | 173/324 |
| 3,453,587 | 7/1969 | Neidecker | 339/256 |
| 3,510,569 | 5/1970 | Gorin | 174/70 |
| 4,013,329 | 3/1977 | Hugin | 339/9 |
| 4,029,978 | 6/1977 | Jager et al. | 310/64 |
| 4,091,299 | 5/1978 | Stepanovich | 310/71 |
| 4,155,019 | 5/1979 | Weghaupt | 310/61 |
| 4,345,804 | 8/1982 | Lanoue | 339/9 |
| 4,368,399 | 1/1983 | Ying | 310/270 |
| 4,629,917 | 12/1986 | Brem | 310/59 |
| 4,712,029 | 12/1987 | Nold | 310/71 |
| 4,870,308 | 9/1989 | Sismour, Jr. | 310/71 |

FOREIGN PATENT DOCUMENTS 0018943  1/1987  Japan ..................... 310/71
1354604  5/1974  United Kingdom .

Primary Examiner—Eugene F. Desmond
Attorney, Agent, or Firm—Nixon & Vanderhye

[57] ABSTRACT

A flexible main lead connector design for connecting an end turn of a rotor winding of a generator/motor to a terminal stud. The connector includes a first elongate, radially directed, conductive member attached to the rotor winding and a second elongate conductor member connected to the centralized terminal stud. The first conductive member has an inverted "T" shape with its base tapering from a relatively thick central portion to relatively thin outer portions. The second conductor member has a central "T" shaped portion and two relatively thin peripheral band portions shaped to generally follow the side and lower top surfaces of the central "T" shaped portion. The bands continue in a curved manner toward and join with the relatively thin outer portions of the first conductive member and thus form a flexible connector allowing relative movement between the first and second conductive members. The connector, however, also supports the flexible bands against centrifugal forces present at rotor operating speeds by the inclusion of the "T" shaped portion of the second conductor member which is positioned to form a support cap for the bands.

11 Claims, 4 Drawing Sheets

MAIN LEAD CONNECTOR FOR A GENERATOR/MOTOR ROTOR

FIELD OF THE INVENTION

The invention relates to electrical connectors between generator rotor field coils and terminal studs where the connector is flexible enough to accommodate coil movements due to temperature changes and the like but sufficiently rigid to withstand centrifugal forces present at operating speeds.

RELATED APPLICATIONS

This application relates to copending application Ser. No. 680,065, filed Apr. 4, 1991, entitled "Using Multilam in a Main Lead Connector for a Generator/Motor Rotor".

BACKGROUND AND SUMMARY OF THE INVENTION

Electrical generators/motors commonly include rotors having shafts for supporting a central relatively large diameter cylindrical body which contains conductive windings which may, for example, produce magnetic flux which in turn produces stator current and voltage. Such windings are typically carried in a series of longitudinal slots that are cut or otherwise formed in the outer periphery and extend radially inwardly, as well as extending along the length of the rotor body. These windings are retained in the slots through the use of dovetail shaped wedges extending along the length of the rotor body through the use of complementary shaped dovetail grooves included within each of the aforementioned slots.

The portion of a winding contained in a longitudinal slot is interconnected to a similar longitudinal portion of another slot by way of an end turn portion which extends beyond the end of the relatively large diameter cylindrical rotor body. At operating speeds of 3600 rpm, for example, rather high centrifugal forces are exerted on the windings. In a conventional such environment the slot wedges restrain the longitudinal portions of the windings against such centrifugal forces and retaining rings attached around a circumferential lip at the ends of a rotor body are conventionally utilized to enclose and restrain the winding end portions against movement in the radially outward direction when the windings are subjected to such centrifugal forces. The retaining rings may be attached to the rotor body by way of shrink fit and other techniques. Some movement of the winding end turns nevertheless occur due to speed and temperature changes of the rotor, as well as the shrink fit nature of the retaining rings.

Current carrying connections to the rotor windings are necessary in order to apply field current to such windings in a generator, for example. Such connections are conventionally made from "bore copper" which may, for example, be an insulated conductor embedded in a number of ways in the rotor shafts which additionally may include slip rings connected to an exciter, for example. Since, as previously noted, speed and temperature changes may cause the end turns of the rotor windings to move both radially and axially, the connections, as well as the windings, are subject to centrifugal forces at operating speeds. Connector designs present formidable problems. For example, as will be appreciated by the artisan, such connectors in addition to being of appropriate size and material to meet current carrying requirements must also be sufficiently flexible to accommodate the noted coil movements and yet be sufficiently rigid to withstand centrifugal forces developed at operating speeds. Accordingly, an appropriate balance must be struck between these contrary requirements in order to avoid premature failures of the main lead connectors which due to the nature and location of such connectors would add significantly to repair costs.

We have discovered a connector design exhibiting the desired degrees of flexibility and rigidity as to be unaffected by relative movement between a winding end turn and a terminal stud associated with the rotor shaft.

Our main lead connector includes first and second conductive members each having a "T" profile. The central portions of these members are substantially coaxial with the tops of the two "T" profiles facing each other. Interconnecting these conductive members are two relatively thin bands of conductive material that are joined to one conductive member on opposite peripheral sides approximately midway along the central leg of the "T" and joined to the other conductive member at the ends of the side legs.

These flexible conductive bands are formed so as to have a portion positioned along the sides of the second conductive member central leg portion, as well as along the lower surface of each side leg. Thus formed, the "T" shaped second conductive member forms a support cap which restrains the flexible band members from movement in the radially outward direction when subjected to centrifugal forces present when the rotor is operating.

Thus, it is an objective of the disclosed main lead connector to avoid premature failure by designing the connector to be sufficiently flexible as to accommodate winding end turn movement associated with rotor temperature and speed changes but, nevertheless, rigid enough in design such that the connector elements can withstand centrifugal forces developed at operating speeds.

These and other objects and advantages of the present invention will become more apparent upon reference to the following specification, appended claims and drawings.

DETAILED DESCRIPTION OF THE DRAWINGS

Figure 1:
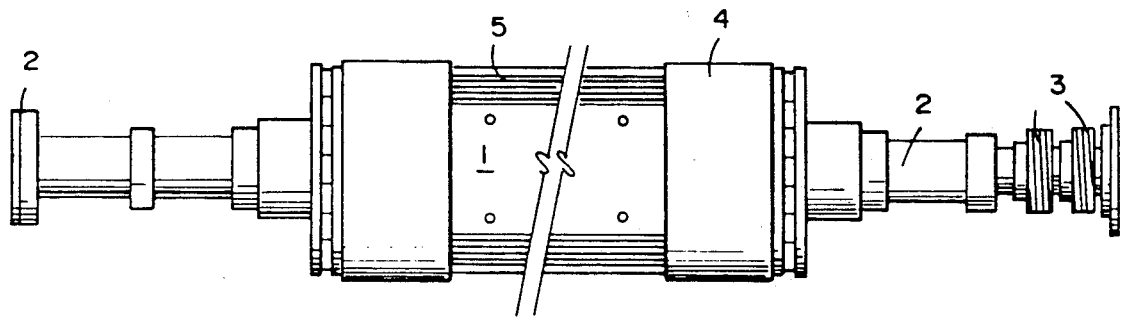
FIG. 1 shows a conventional generator/rotor including coil slots, retaining rings and exciter slip rings.

The rotor illustrated in FIG. 1 shows an exemplary rotor of conventional design which is the exemplary environment in which the disclosed flexible main lead connector may be used for forming a low resistance current path between the end turns of a rotor winding and "bore copper". Generally speaking, "bore copper" is conventionally formed of insulated conductors which may run longitudinally in a shaft 2 between slip rings 3, for example, and the end turns (not shown in FIG. 1) which reside under retaining rings 4.

The relatively large diameter body of the generator rotor 1 includes a series of longitudinal radially directed slots. Each of the slots includes longitudinal winding portions with overlying dovetail shaped wedges residing in complementary shaped grooves in each slot. Such wedges restrain the longitudinal portions of the windings from radial outward movement in response to centrifugal forces exerted on such windings when the rotor is operated.

In such conventional rotors a longitudinal portion of the windings extends beyond the end of the rotor body portion 1 and is joined to another longitudinal winding section by an end turn winding portion. Since the winding end turn portions are not within a slot and, therefore, not restrained against outward movement, a retaining ring 4, as is generally illustrated in FIG. 1, is conventionally included using shrink fit and other conventional techniques to attach the retaining ring 4 usually around a circumferential lip on the end of the rotor body. Without the retaining ring in place, the end turns would be thrust radially outward by centrifugal forces as the rotor spins. With the retaining ring 4 in place, however, the end turns are restrained against substantial radial movement due to the confining nature of the retaining ring.

Nevertheless, due to the nature of shrink fit elements, as well as temperature and speed changes exerted on the rotor, winding end turns as well as other rotor elements such as terminal studs extending from the shaft 2 toward the windings, experience radial as well as some axial movement. In order to establish and maintain a current carrying path between the bore copper and the windings without experiencing premature connection path failures, it is necessary to provide a connector design that will accommodate the coil movements previously noted.

Figure 2A:
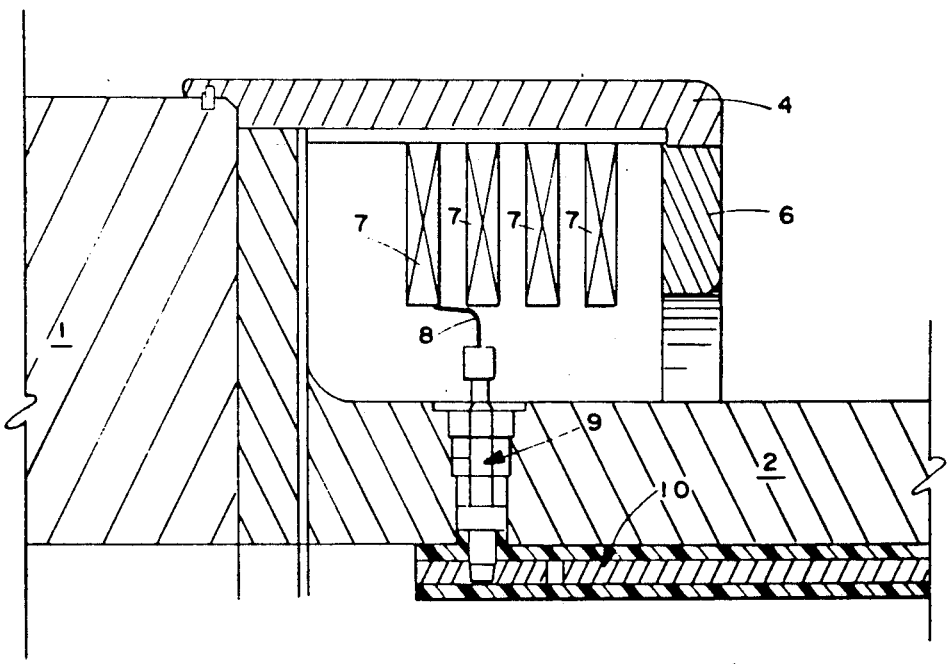
FIGS. 2a, 2b and 2c show conventional main lead connector arrangements for forming an electrical connection between rotor bore copper and a rotor coil end turn section.
Figure 2B:
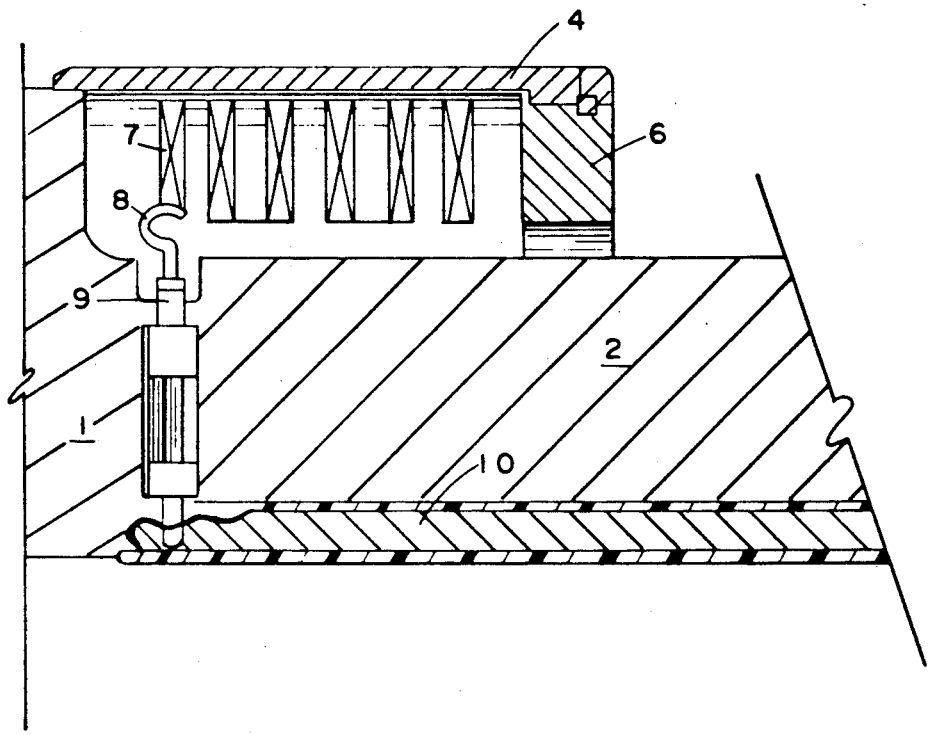
Figure 2C:
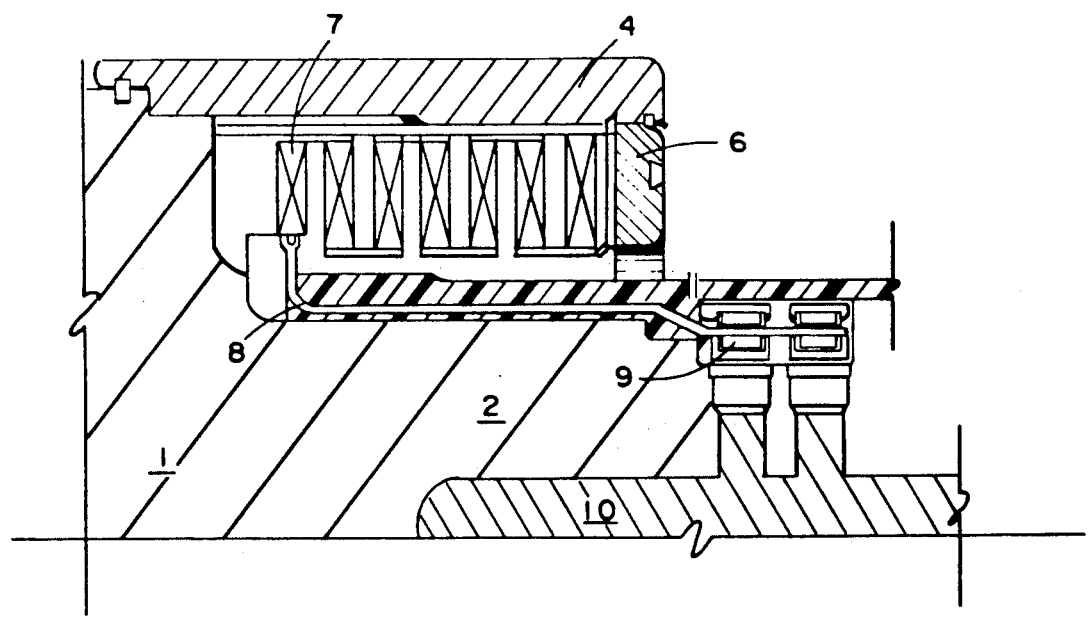

As may be seen in FIGS. 2a, 2b and 2c, three conventional retaining ring (4) and winding end turn (7) arrangements are illustrative of that which may be conventionally found below the retaining rings in rotors of the nature shown in FIG. 1. It is to be noted that the same or similar elements of the illustrated rotors are designated by the same number in each of the figures. The conventional arrangements shown in these figures include centering rings 6, bore copper 10, which may reside in shaft portion 2 in various arrangements, as well as terminal studs 9 forming part of the electrical current path to a winding 7. Such figures additionally illustrate that it is conventional to include a main lead connector 8 between winding 7, for example, and terminal stud 9. Such main lead connectors are conventionally formed of copper strip and may take various forms including those illustrated in U.S. Pat. Nos. 4,368,399 to Ying et al and 4,870,308 to Sismour, for example.

As detailed above, however, the artisan will recognize that such main lead connectors are subject to centrifugal forces, as well as speed and temperature changes during normal operation, and such factors may produce premature failures of the connectors.

Figure 4:
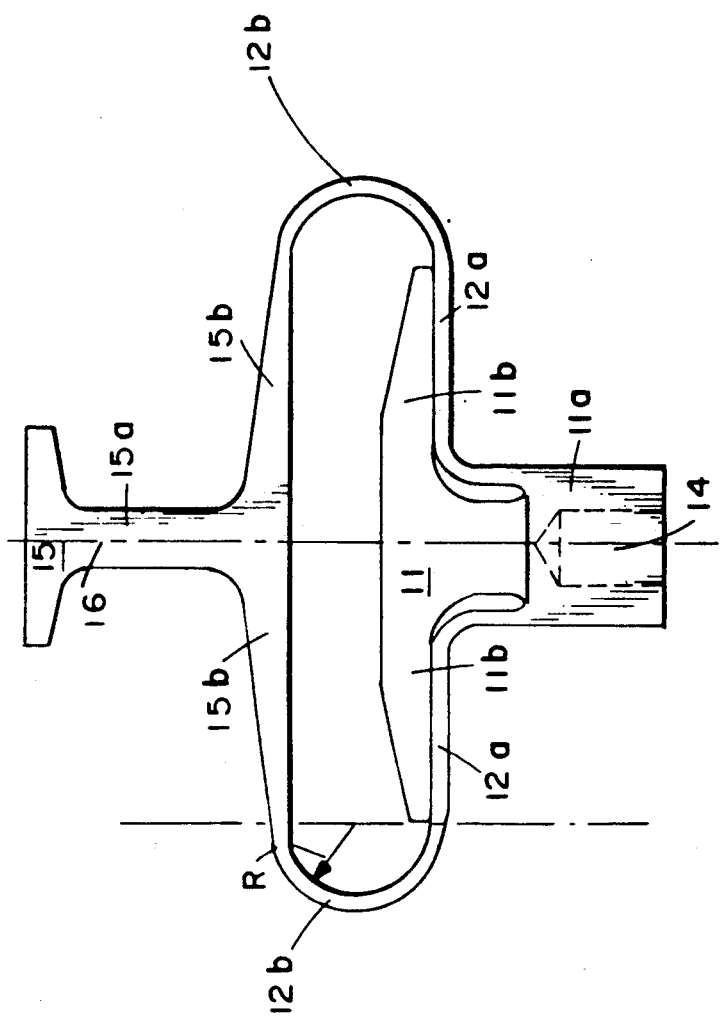
FIG. 4 is an orthogonal side view of that which is represented in FIG. 3 and which illustrates the profile of our main lead connector design.
Figure 3:
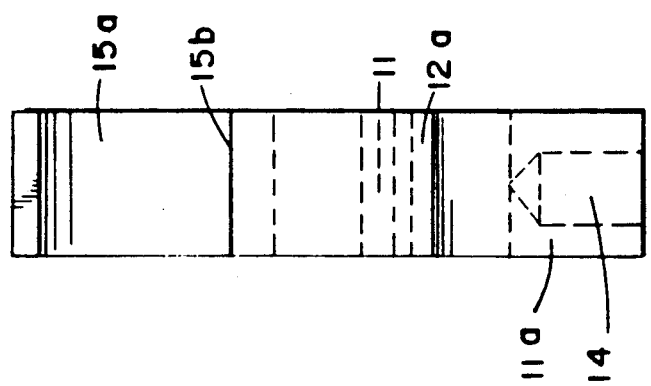
FIG. 3 shows a side view of our main lead connector design.

The main lead connector, as illustrated in FIGS. 3 and 4, has been designed to incorporate sufficient flexibility to allow for movement of the winding end turns or the terminal stud. The connector design also incorporates sufficient rigidity by the incorporation of support cap 11, for example, which effectively restrains flexible portions 12a and 12b, for example, from substantial movement in the radially outward direction by resisting the centrifugal force on the flexible bands at operating speeds.

Although the main lead connector illustrated in FIGS. 3 and 4 may be fabricated from separate elements and subsequently joined to form an integral unit, the presently preferred embodiment is of a one-piece design produced by electrical discharge machining techniques. Under such circumstances, although it is recognized that the connector is of unitary construction, for ease of description it will be described as comprising several distinct elements or portions.

The connector includes a first conductive portion 11, as well as a second conductive portion or member 15, each of which has a "T" shaped profile. Additionally, both of the conductive members include a central leg portion 11a and 15a, respectively, as well as two side legs 11b and 15b.

The first and second conductive members (11 and 15, respectively) are positioned so as to be symmetrical about the same axis 16, as well as being positioned such that side legs 11b and 15b are adjacent to each other.

As will be noted from a review of FIG. 4, the flexible intermediate bands include portions 12a and 12b and are connected at the approximate midpoint of central leg 11a of conductive member 11. The bands are also formed so as to generally follow the lower surface of the side legs of member 11. In this manner, member 11 forms a support cap for the intermediate conductive bands such that the support cap will restrain these flexible bands from radially outward movement when subjected to centrifugal forces produced by conventional operating speeds of the rotor. As will additionally be noted from a review of FIG. 4, flexible intermediate band portions 12a are connected to the relatively narrow ends of side legs 15b by way of the semicircular flexible band portions 12b.

Figure 5:
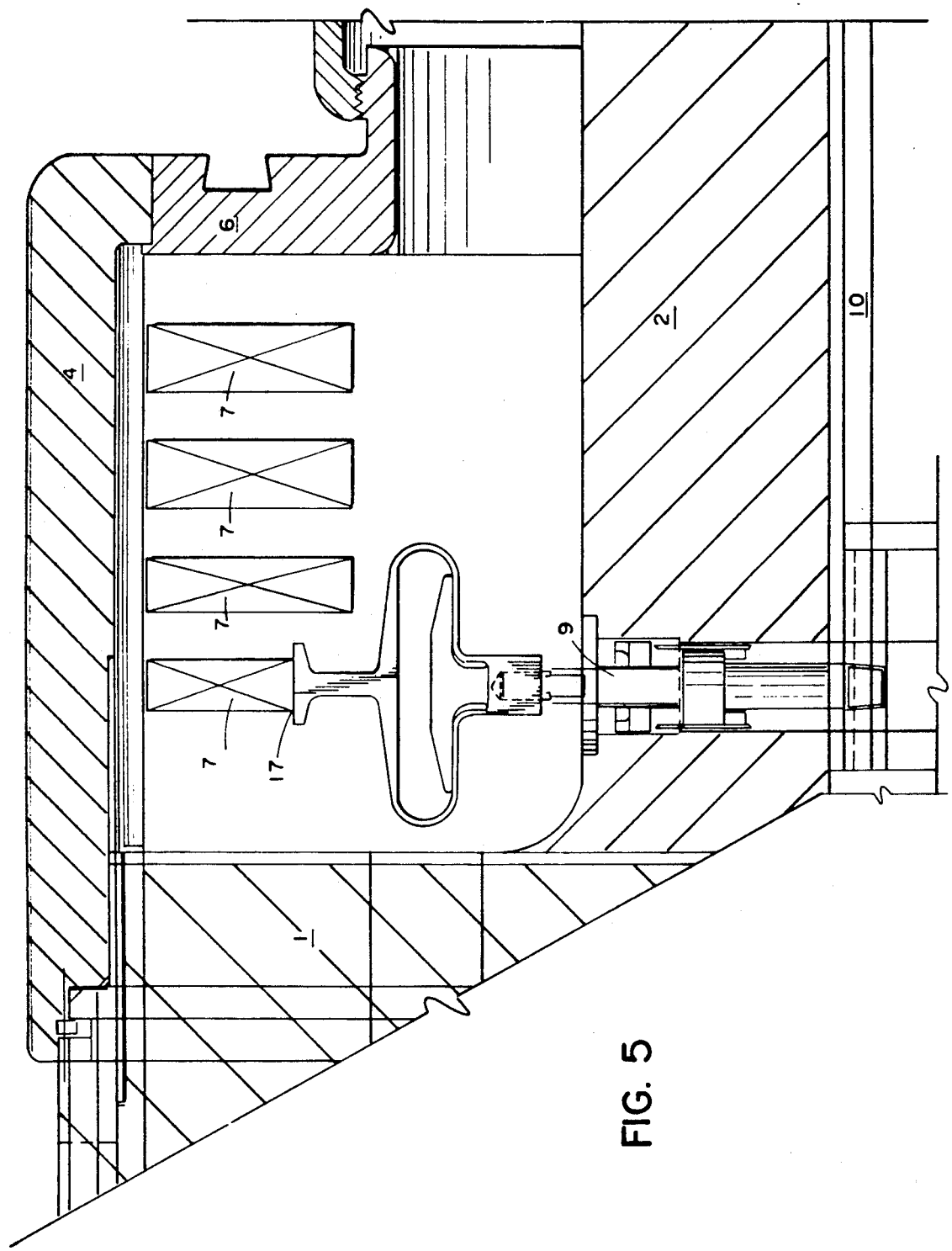
FIG. 5 illustrates the disclosed main lead connector as it would be installed in an exemplary rotor environment.

Considering both FIGS. 4 and 5, it will be seen that the exemplary main lead connector includes a bore hole 14 for accepting terminal stud 9 which in turn is connected to bore copper 10. The other end of the exemplary main lead connector is connected to rotor winding end turn 7 by way of brazing at 17. Brazing is additionally used for joining the terminal stud to the main lead connector.

As previously noted, electrical discharge machining techniques are used to produce the main lead connector from a unitary piece of high conductivity copper alloy such as chromium-copper. A main lead connector produced in the noted manner will be sufficiently rigid to resist the centrifugal forces developed at operating speeds but also sufficiently flexible as to accommodate coil or stud movements associated with speed and temperature changes, as well as the shrink fit nature of the retaining ring. That is to say, the support cap 11 of the connector is designed such that it will not significantly reduce the flexibility of the connector when the connector top is pushed radially inwardly by the retaining ring shrink fit or other coil movement, nor will the flexibility of the connector be significantly reduced when the terminal stud expands in a radially outward direction or when the connector top is pushed outwardly in an axial direction due to temperature changes and the like.

As will be recognized by the artisan, modifications of the main lead connector may be made such as fabricating the connector from separate elements. Moreover, the support cap portion of element 11 can be made (as indicated above) integral and of the same material as portion 11a, or it can be made of other material and may require a transition piece for connection to the remainder of the connector.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electrical connector for forming a low resistance current path from a central main terminal to a conductor adjacent the periphery of a rotatable body, said connector comprising:
    a first conductive member with two side legs and a central leg portion, and having the profile of an inverted "T", said first member adapted to be connected to said peripheral conductor;
    a second conductive member with two side legs and a central portion and having a "T" shaped profile, said second conductive member adapted to be connected to said main terminal;
    flexible intermediate conductive members joined to the peripheral edges of said two side legs of said first conductive member and also connected to the sides of the central leg of said second conductive member, a portion of each said intermediate member formed to generally follow the lower surface of said side legs of the second conductive member,
    whereby the "T" shaped second conductive member restrains said flexible intermediate members against movement due to centrifugal forces present when said body is rotating.

2. An electrical connector as in claim 1 wherein said flexible intermediate members are relatively thin bands of conductive material and the side legs of said first conductive member are relatively thick adjacent to the central leg portion of said first member and taper to join the relatively thin intermediate members.

3. An electrical connector as in claim 1 wherein the side legs of said second conductive member are relatively thick adjacent to the central leg portion of said second member and taper to relatively thin ends,
    whereby said side legs of the second conductive member form a support cap to restrain said intermediate conductive members from radial outward movement when subjected to centrifugal forces.

4. An electrical connector as in claim 1 of integral construction wherein said members are formed from a single piece of conductive material.

5. An electrical connector as in claim 1 further including a bore hole in said second conductive member for use in forming a connection with said main terminal.

6. A main lead connector for connecting a rotor winding of a generator or motor to a rotor terminal element, said connector comprising:
    first and second conductive members, each member having a substantially "T" shaped profile with a central portion and two side portions;
    said first and second conductive portions positioned such that both are symmetrical about a common axis through the central portions thereof and so that the "T" profiles are each inverted with respect to the other;
    first and second flexible bands, each band connected to a side portion of said first member, each further connected to opposite sides of the central portion of said second member and each including a portion which is adjacent a side portion of said second member,
    whereby the first and second flexible bands are restrained from movement toward said winding when the rotor is rotating.

7. The main lead connector of claim 6 further comprising means for joining said rotor terminal element to said second conductive member.

8. The main lead connector of claim 6 wherein the first and second flexible bands are connected at the approximate midpoints of said second conductive member sides.

9. The main lead connector of claim 6 wherein said first and second members are respectively connected to the rotor winding and terminal by brazing.

10. The main lead connector of claim 6 wherein said members and said bands are of a one-piece integral design.

11. The main lead connector of claim 6 wherein said members and said bands are of a high conductivity alloy such as chromium-copper.

* * * * *